United States Patent [19]
Visser

[11] 3,824,904
[45] July 23, 1974

[54] LINEAR ACTUATOR
[75] Inventor: Peter J. Visser, Niles, Mich.
[73] Assignee: Clark Equipment Company, Buchanan, Mich.
[22] Filed: Dec. 23, 1971
[21] Appl. No.: 211,523

[52] U.S. Cl............... 92/128, 92/168, 92/253
[51] Int. Cl.................. F16j 15/18, F16j 9/00
[58] Field of Search ......... 92/168, 250, 249, 248, 92/165, 257, 128, 166, 167, 255–261, 172; 91/187

[56] References Cited
UNITED STATES PATENTS
1,747,968  2/1930  Braren .................... 92/167
2,799,523  7/1957  Parker .................... 92/168
3,155,015  11/1964 Genz ...................... 92/249
3,169,455  2/1965  Hoffmann ................ 92/250
3,311,030  3/1967  Halstead .............. 92/165 R
3,333,513  8/1967  Wettstein ............. 92/165 R
3,695,150  10/1972 Salzmann ................ 92/172

Primary Examiner—Paul E. Maslousky
Attorney, Agent, or Firm—Kenneth C. Witt

[57] ABSTRACT

A linear actuator of the piston and cylinder type having sleeves with spherical surfaces for the piston and the rod on which the piston is mounted for providing improved resistance to lateral forces.

6 Claims, 4 Drawing Figures

LINEAR ACTUATOR

BACKGROUND OF THE INVENTION

1. Field of the Invention.

This invention relates to hydraulic linear actuators of the piston and cylinder type which are used in numerous machines for the operation of mechanisms of various types. For example, such actuators are widely used for the operation of various load handling and transfer mechanisms, portions of material handling machines, portions of earth moving machinery and equipment, and the like.

2. Description of the Prior Art.

Many actuators of the type mentioned are applied or used in ways in which they are subject to considerable lateral forces. It would be desirable to limit the forces which the actuators produce, and the forces acting upon them, entirely to linear forces along the axes of the actuators, but it will be appreciated by those skilled in the art that in many circumstances it is not possible to eliminate lateral forces which also act upon such actuators. Such lateral forces tend to produce increased wear on the linear actuators and cause earlier and more frequent adjustment and repairs because they tend to cause uneven wear on the bearing surfaces, seals and packing which surround the piston rod and also on the corresponding elements for the piston.

It has been common practice heretofore, particularly at the end of the cylinder from which the rod porjects to increase the length of the bearing surface by which the rod is supported and guided within the cylinder, whenever it is known that the actuator will be subjected to larger than normal lateral forces. This is helpful in increasing the time of usage before adjustment or repairs are required, but it also increases the length and cost of the actuator, and neither of these is desirable.

It is an object of the present invention to provide a linear actuator of the piston-cylinder type which will withstand greater lateral forces and withstand them for a greater period of usage without the necessity of adjustment or repairs, and without increasing the length significantly.

SUMMARY OF THE INVENTION

In carrying out my invention in one preferred mode, I provide a piston-cylinder type linear actuator in which the piston has a spherical external surface, and an annular sleeve member with a conforming concave or internal spherical surface is located between the external spherical surface on the piston and the inner surface of the surrounding cylinder member. A second annular sleeve member is located between the rod and the cylinder member, the second sleeve member having an outer spherical surface, and a retainer member having an inner surface conforming to the outer surface of the second sleeve member is located between the second sleeve member and the cylinder member.

DESCRIPTION OF THE PREFERRED EMBODIMENT

Figure 4:
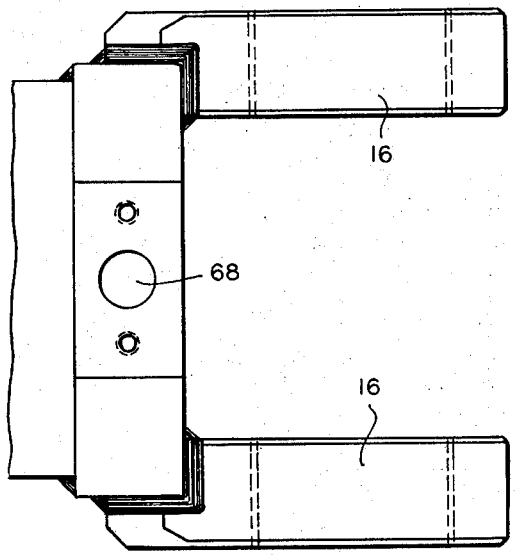
FIG. 4 is a fragmentary top view of the other end of the actuator of FIG. 1.

In the drawing, the numeral 10 indicates generally the linear actuator of the present invention. The actuator 10 includes an outer cylinder member 12 with an axial opening of circular cross section therethrough. At its so-called head end (opposite the end at which the rod projects from the cylinder member), the actuator includes a boss portion 16 which is rigidly secured to the cylinder member in a suitable manner such as by welding. As shown in FIG. 4, the boss portion 16 may comprise two separated parts.

At the other or rod end is located another boss member 18 which is secured to a piston rod 20. At the inner end of rod 20 a piston 22 is secured rigidly to the piston rod, and the rod and piston are arranged to reciprocate within the cylinder.

The piston 22 includes a spherically shaped outer surface 24 thereon, and line 26 indicates a radius of the sphere extending from the center at 28, the center 28 being located on the longitudinal axis 29 of the actuator 10. Between the spherical surface 24 of the piston and the inner surface 14 of the cylinder is located an annular sleeve member 30 which has a spherical inner surface 32 conforming to the spherical surface on the piston while the outer surface 34 of the sleeve 30 is circular in cross section and fits closely inside the inner surface 14 of the cylinder 12.

The piston 22 is provided with a pair of conventional seals 36 at either end thereof mounted upon suitable shoulder portions on the piston. Such seals separate the pressurized fluid which operates the piston in one direction from that which operates it in the other direction as described hereinafter.

Near the rod end of the actuator there is another sleeve identified by the numeral 40. Sleeve 40 has an outer spherical surface 42 thereon and line 44 indicates a radius of the sphere emanating from the center 46 which likewise is on the longitudinal centerline 29 of the actuator. The inner surface 48 of the sleeve 40 is circular in cross section and fits closely against the outer surface of the piston rod 20. The sleeve 40 is retained in position by a pair of annular spacer members 49 and 50 in the construction illustrated, although it will be appreciated that a single spacer member may be utilized and that the construction illustrated embodying two spacer members is to facilitate assembly inasmuch as spacer member 50 can be assembled first, followed by the sleeve 40 and then the other spacer member 49, while the rod 20 is in place inside the cylinder 12. The spacers 49 and 50 and hence the sleeve 40 are held in position by a retainer 52 which holds a seal 54 in a circular recess therein, and also holds a wiper ring 56 to clean the rod as it enters the cylinder and assist in preventing the entry of dirt and foreign material into the actuator. The retaining ring also holds in place a static seal 58 in the normal manner to seal the actuator against leakage of hydraulic fluid.

Figure 2:
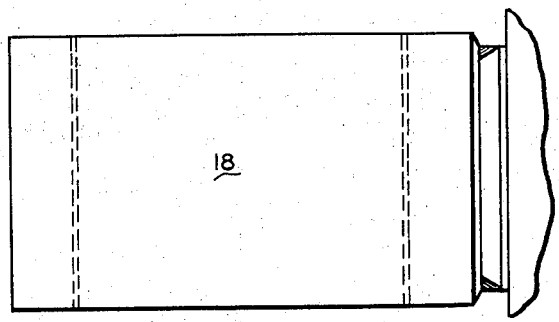
FIG. 2 is a fragmentary top view of one end of the actuator of FIG. 1.
Figure 3:
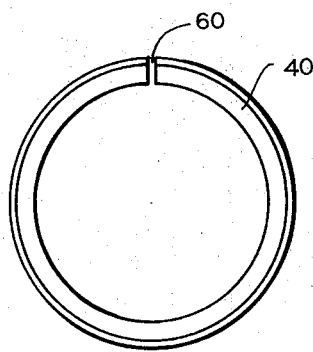
FIG. 3 shows an isolated view of one of the sleeve members which is embodied in the actuator of FIG. 1.

Both of the sleeves 40 and 30 are annular, but each has a small gap extending longitudinally of the actuator, and this is indicated for sleeve 40 in FIG. 2 where the gap is indicated by the numeral 60. In a typical case of a relatively large actuator, this gap is 0.060 inches. This is for an actuator in which the outside diameter of the rod 20 is 4.50 inches, the inside diameter of the cylinder is 6.00 inches, the collapsed length of the actuator is 129.50 inches, and the extended length of the actuator is 239.50 inches.

Each of the sleeves 40 and 30 also is provided with sharp edges indicated at 62 and 63 for sleeve 40 and at 64 and 65 for sleeve 30. These sharp edges are effective to scrape off of the rod any dirt or foreign materials which may penetrate the actuator, thus preventing such dirt and foreign materials from getting between the sleeves and their respective external or internal cylindrical surfaces on the rod 20 and cylinder 12, respectively. It will be understood that such dirt and impurities would tend gradually to damage the smooth working surfaces of the sleeves and thus cause them to deteriorate, but the sharp edges which prevent the entry of dirt and foreign materials assist in preventing such deleterious action. The longitudinal gap in each of the sleeves is useful in accommodating the different coefficient of expansion of the sleeves as compared to the rod, piston, cylinder and other parts with which they are assembled. In addition, however, such gaps permit the flow of hydraulic fluid between the two ends of both of the sleeves to assist in cooling, particularly the sharp edges, and thus assisting in preventing their deterioration.

It will be appreciated from the following description that the sleeve 40 is subjected directly to pressurized hydraulic fluid which is directed into the actuator in order to extend it. In the case of the sleeve 30, there are seals 36 on both sides which tend to prevent the entry of hydraulic fluid into the spaces indicated at 66 between such seals and the sleeve 30, but it will be appreciated by those skilled in the art that the porosity of the steel cylinder wall and the thin film of lubricant which is present between the seals 36 and the inner wall 14 and between the sleeve 30 and wall 14 will soon build up a supply of fluid in the spaces 66 as the actuator is reciprocated to move the piston up and down the length of the cylinder.

Figure 1:
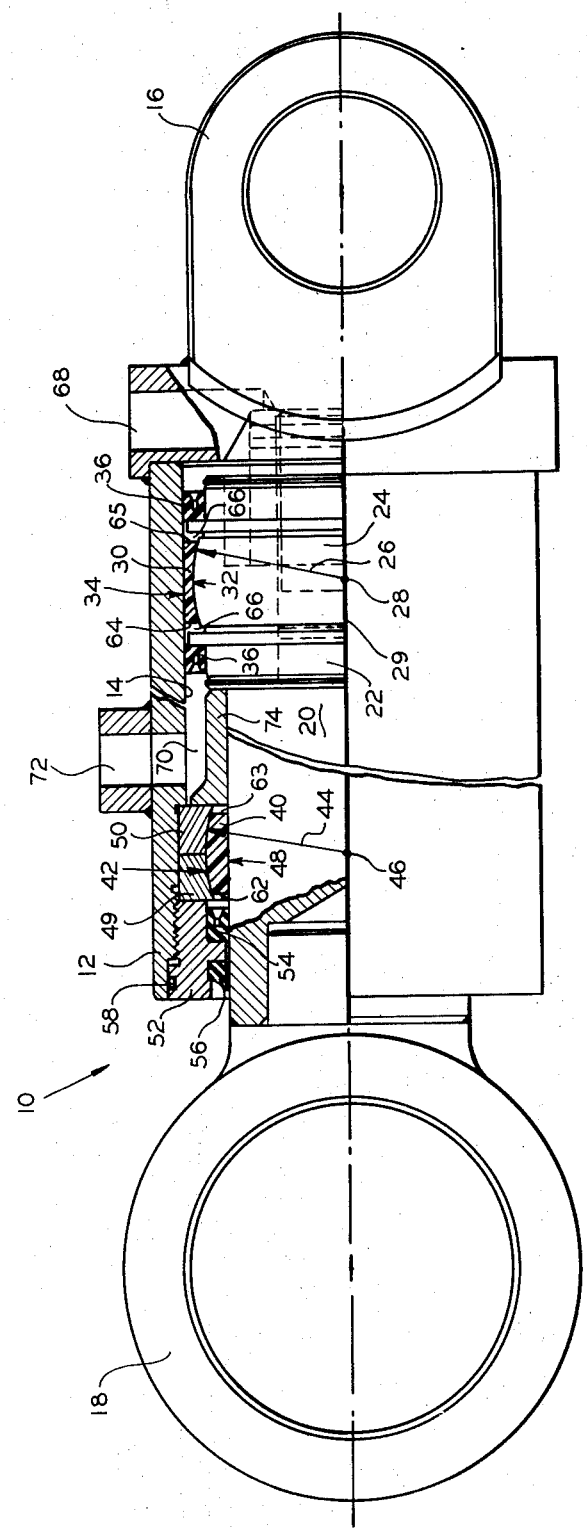
FIG. 1 of the drawing, which is partly in section, shows a linear actuator embodying the present invention.

As shown in FIG. 1, the actuator has a large section eliminated from the center in order to minimize the length of the view of FIG. 1. In the operation of the actuator 10, it is extended by introducing hydraulic fluid under pressure at port 68. This causes the piston 22 and the rod 20 and boss 18 secured thereto to extend to the left and extend the length of the linear actuator. At the same time, hydraulic fluid which is in chamber 70 is expelled through port 72. When it is desired to retract the actuator, pressurized fluid is introduced into port 72 and chamber 70 and is expelled from the cylinder to the right of the piston out through port 68. The actuator is provided with a stop member 74 to prevent the piston 22 from covering the port 72 in the maximum extended position.

An illustrative use for an actuator according to the present invention is shown in the load transfer mechanism of U.S. application Ser. No. 187,362, now U.S. Pat. No. 3,718,221 dated Feb. 27, 1973, which is assigned to the same assignee as the present invention, and reference is made specifically to the main actuators 24 and 26 of the cross-referenced load transfer mechanism which desirably may embody the present invention.

It will be appreciated that the sleeves 30 and 40 of the present construction provide the bearing members by which forces are transmitted between the reciprocal elements, that is, the piston and rod of the actuator and the other element, namely, the cylinder 12. The inner surface 14 of cylinder 12 is circular in cross section within close tolerance and has a very smooth finish. Similarly, the outside surface of the rod 20 is of circular cross section within very close tolerance and also has a very smooth finish. The sleeves 30 and 40 are of material which has a low coefficient of friction with the surfaces upon which they slide and also have the ability to withstand a relatively high unit pressure. One suitable material for sleeve members 30 and 40 is a synthetic plastic material such as a phenolic resin, which resin may be fiber or fabric reinforced to provide additional strength. However, the sleeve members need not be nonmetallic or entirely nonmetallic; there are known metals and combinations of metallic and non-metallic materials which also operate satisfactorily in actuators embodying the present invention. The cylinder, piston and rod preferably are of steel.

During the operation of the actuator to move the piston and rod outwardly and inwardly of the cylinder the present construction equalizes the forces acting upon the sleeves 30 and 40 because of the spherical surfaces between them and their mating piston and retainer elements. With straight sleeves or bearings as have been employed in many prior art constructions, a lateral force applied to the actuator, that is, a force normal to the longitudinal axis of the actuator--or any force other than one along the longitudinal axis--tends to bend or deform the actuator and results in a concentration of stress, particularly for the sleeve at the rod end of the actuator near one end of the sleeve or the other, depending upon the direction and location of the lateral force. With the construction of this invention, however, the load transmitted between the sleeve and its mating member is approximately uniform over the spherical surface. If the lateral force on the actuator is sufficient to deform or deflect the actuator, one or both of the sleeves and their mating parts will undergo relative "spherical" movement and thus will maintain the loading at an approximately uniform amount over the spherical surfaces. It will be understood that the relative motion is between the mating spherical surfaces and while it is slight in most cases, nevertheless, such motion enables the maintenance of an approximately uniform load over the spherical surfaces, thus minimizing the wear at either extremity of the sleeves and promoting longer life and minimizing the number of adjustments that may be required.

While the present invention has been described and illustrated herein in the form of an actuator having a cylinder and a rod and piston therein, it will be appreciated that it is applicable also to a so-called ram type actuator in which a larger diameter hollow ram member is used instead of the rod and piston. Thus, while I have described and illustrated a preferred embodiment of my invention, it will be appreciated that modifications may be made by those skilled in the art. Accordingly, I intend to cover by the appended claims all such modifications which fall within the true spirit and scope of my invention.

I claim:

1. In a linear actuator having an outer cylinder member with an inner surface and an inner reciprocal piston mounted on a rod which projects from one end of the cylinder member, the improvement which comprises a spherical external surface on the piston, a first annular sleeve member located between the said spherical external surface on the piston and the inner surface of the cylinder member and in sliding contact with the said cylinder member, the said first sleeve member having an internal surface conforming to and in contact with the said spherical external surface on the piston, portions of said piston spherical surface extending through and beyond each end of said first annular sleeve member, a second annular sleeve member located between the rod and cylinder member, the said second sleeve member having an outer spherical surface, and a spacer member located wholly within the outer cylinder member, the said spacer member having an outer surface abutting the inner surface of the cylinder member and having an inner surface conforming to and in contact with the said outer surface of the said second sleeve member.

2. In a linear actuator as specified in claim 1, a gap in each of the said sleeve members permitting the flow of fluid between the opposite ends of the sleeve members respectively.

3. In a linear actuator as specified in claim 2, sharp edges at the ends of the sleeve members adjacent their mating surfaces with the rod and cylinder respectively for assisting in preventing the entry of dirt and foreign material between the sleeves and their respective mating surfaces.

4. In a linear actuator as specified in claim 1, the improvement in which the center of the spherical surfaces on both of the said sleeves is located on the longitudinal centerline of the actuator.

5. In a linear actuator as specified in claim 1 in which the said spacer member is composed of two annular parts for ease of assembly.

6. A linear actuator as specified in claim 1 in which the said first sleeve member is of material different from that of the said piston whereby during lateral loading the load transmitted between the said piston and the said first sleeve member is approximately uniform over their mating spherical surfaces, and the said second sleeve member likewise is of material different from that of the said spacer member whereby lateral loading results in approximate uniform loading over their mating spherical surfaces.

* * * * *